(12) United States Patent
Walden et al.

(10) Patent No.: US 10,864,771 B2
(45) Date of Patent: Dec. 15, 2020

(54) VEHICLE WHEEL

(71) Applicant: KUBOTA CORPORATION, Osaka (JP)

(72) Inventors: Robert Walden, Gainesville, GA (US); Barry Jordan, Flower Branch, GA (US)

(73) Assignee: KUBOTA CORPORATION, Osaka (JP)

(*) Notice: Subject to any disclaimer, the term of this patent is extended or adjusted under 35 U.S.C. 154(b) by 191 days.

(21) Appl. No.: 15/495,007

(22) Filed: Apr. 24, 2017

(65) Prior Publication Data

US 2018/0304676 A1    Oct. 25, 2018

(51) Int. Cl.
*B60B 3/04* (2006.01)
*B60B 3/10* (2006.01)
*B60B 3/00* (2006.01)

(52) U.S. Cl.
CPC .............. *B60B 3/041* (2013.01); *B60B 3/005* (2013.01); *B60B 3/04* (2013.01); *B60B 3/10* (2013.01); *B60B 3/007* (2013.01); *B60B 2310/302* (2013.01); *B60B 2900/311* (2013.01); *B60B 2900/572* (2013.01)

(58) Field of Classification Search
CPC .. B60B 3/02; B60B 3/04; B60B 3/041; B60B 3/10; B60B 1/06; B60B 1/08; B60B 1/10; B60B 25/004
USPC ......................................... D29/204–205, 209
See application file for complete search history.

(56) References Cited

U.S. PATENT DOCUMENTS

| | | | | |
|---|---|---|---|---|
| 2,551,783 A | * | 5/1951 | Ash ........................... | B60B 3/04 301/63.104 |
| 3,210,126 A | * | 10/1965 | Travers ..................... | B60B 3/04 301/63.104 |
| 4,286,825 A | * | 9/1981 | Sieving ................... | B60B 21/02 301/63.104 |
| 4,504,095 A | * | 3/1985 | Edwards ................. | B60B 3/005 301/63.104 |
| 5,431,486 A | * | 7/1995 | Kamahori ............... | B60B 3/044 156/87 |
| 5,544,945 A | * | 8/1996 | Daudi .................... | B21D 53/26 301/64.101 |
| 5,899,537 A | * | 5/1999 | Abe ........................ | B21D 53/26 301/63.101 |
| D453,132 S | * | 1/2002 | Chen ........................... | D12/209 |
| D472,509 S | * | 4/2003 | Laengerer .................... | D12/209 |
| D507,220 S | * | 7/2005 | Lucaora ....................... | D12/209 |
| D578,947 S | * | 10/2008 | Arora ........................... | D12/209 |

(Continued)

*Primary Examiner* — Jason R Bellinger
(74) *Attorney, Agent, or Firm* — Greenblum & Bernstein, P.L.C.

(57) ABSTRACT

A vehicle wheel includes a rim having an inner peripheral surface, and a center disc. The center disc includes a disc portion, and an arm plate portion extending radially outward from the disc portion. The arm plate portion includes an outer boundary defined by a plurality of arc outer peripheral surfaces and a plurality of concave boundary surfaces. The plurality of arc outer peripheral surfaces have a radius equal to a radius of the inner peripheral surface of the rim. The plurality of arc outer peripheral surfaces are joined to the inner peripheral surface of the rim at a weld attachment interface to produce a plurality of holes defined by the plurality of concave boundary surfaces and the inner peripheral surface of the rim.

18 Claims, 2 Drawing Sheets

(56) References Cited

U.S. PATENT DOCUMENTS

| | | | |
|---|---|---|---|
| D631,812 S * | 2/2011 | Juergens | D12/209 |
| 7,922,260 B2 * | 4/2011 | Rodrigues | B60B 3/002 |
| | | | 301/63.101 |
| 8,398,178 B2 * | 3/2013 | Kihara | B60B 3/007 |
| | | | 301/63.101 |
| 2005/0168054 A1 * | 8/2005 | Handa | B60B 3/008 |
| | | | 301/63.104 |
| 2011/0043029 A1 | 2/2011 | Fior et al. | |

* cited by examiner

VEHICLE WHEEL

TECHNICAL FILED OF INVENTION

The disclosure relates to a vehicle wheel including a rim, and a center disc joined to an inner peripheral surface of the rim.

RELATED ART OF INVENTION

A vehicle wheel disclosed in US 2011/0043029 includes a rim, a center disc, and a plurality of discrete structural arms that connect the center disc to the rim. The center disc is spaced radially inwardly from an inner peripheral surface of the rim, and includes a body having a plurality of protruding portions separated from each other by curved recesses and arranged along a circumferential direction in an outer peripheral area of the disc. Each of the structural arms has a first arm end attached to the inner peripheral surface of the rim by welding, and a second arm end received within one of the curved recesses of the body and joined to the center disc by welding. With such an arrangement, a hole created between two adjacent arms is defined by shapes of side edges of the arms and the number of arms. The hole may define a large area with a small number of arms having a small width. In this, each recess of the center disc has to be manufactured with precise dimensions because a position of the first arm end with respect to the inner peripheral surface of the rim is determined by inserting the second arm end into the associated recess of the center disc. Further, the manufacturing costs would increase because each of the arm ends has to be joined to the rim or to the center disc by welding.

SUMMARY OF INVENTION

The wheel vehicle disclosed herein allows a shape of a hole produced between two adjacent arms to be freely selected and to have an appropriate size with the required structural rigidity being maintained.

The wheel vehicle includes a rim having an inner peripheral surface, and a center disc. The center disc includes a disc portion having a plurality of hub-mounting holes, and an arm plate portion having a plurality of arms and extending radially outward from the disc portion. The arm plate portion includes an outer boundary defined by a plurality of arc outer peripheral surfaces and a plurality of concave boundary surfaces. The plurality of arc outer peripheral surfaces and the plurality of concave boundary surfaces are continually arranged alternately. The plurality of arc outer peripheral surfaces have a radius equal to a radius of the inner peripheral surface of the rim. The plurality of arc outer peripheral surfaces are joined to the inner peripheral surface of the rim at a weld attachment interface to produce a plurality of holes defined by the plurality of concave boundary surfaces and the inner peripheral surface of the rim.

With the above arrangement, the arm plate portion is integrally formed with the disc portion to extend radially outward from the disc portion, which allows the center disc to be connected to the rim simply by joining the arc outer peripheral surfaces to the inner peripheral surface of the rim at a weld attachment interface. Further, each of the concave boundary surfaces is defined by the two separate edges to create an open area, as a result of which a shape of the concave boundary surfaces, and thus a shape of the holes can be desirably determined. This achieves the vehicle wheel having the holes of increased size with the required structural strength being maintained.

In some embodiments, each of the concave boundary surface may include a first edge and a second edge facing each other, in which the first edge is connected to each of the plurality of arc outer peripheral surfaces with an obtuse angle, and the second edge is connected to each of the plurality of arc outer peripheral surfaces with an acute angle. Such an arrangement provides improved appearance that emphasizes powerfulness and high-speed performance.

DETAILED DESCRIPTION OF INVENTION

Figure 1:
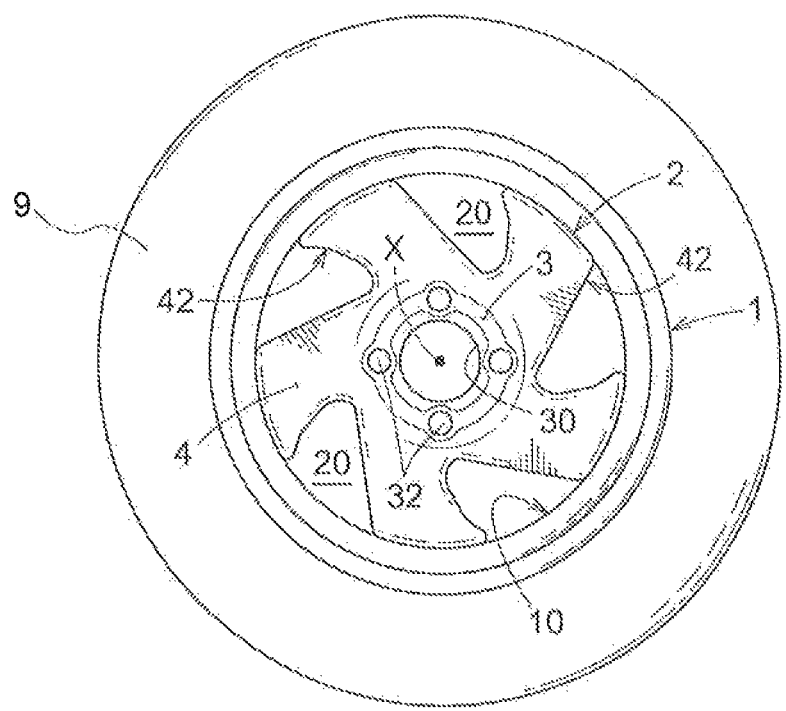
FIG. 1 is a front view of a vehicle wheel with a tire attached.

An embodiment of a vehicle wheel will be described hereinafter. Referring to FIG. 1, the vehicle wheel with a tire 9 attached includes a rim 1, and a center disc 2. Although not shown in detail here because of its well-known structure, the rim 1 has a shape in vertical section suitable for putting the tire 9 thereon. The vehicle wheel is rotatable about an axis X.

Figure 2:
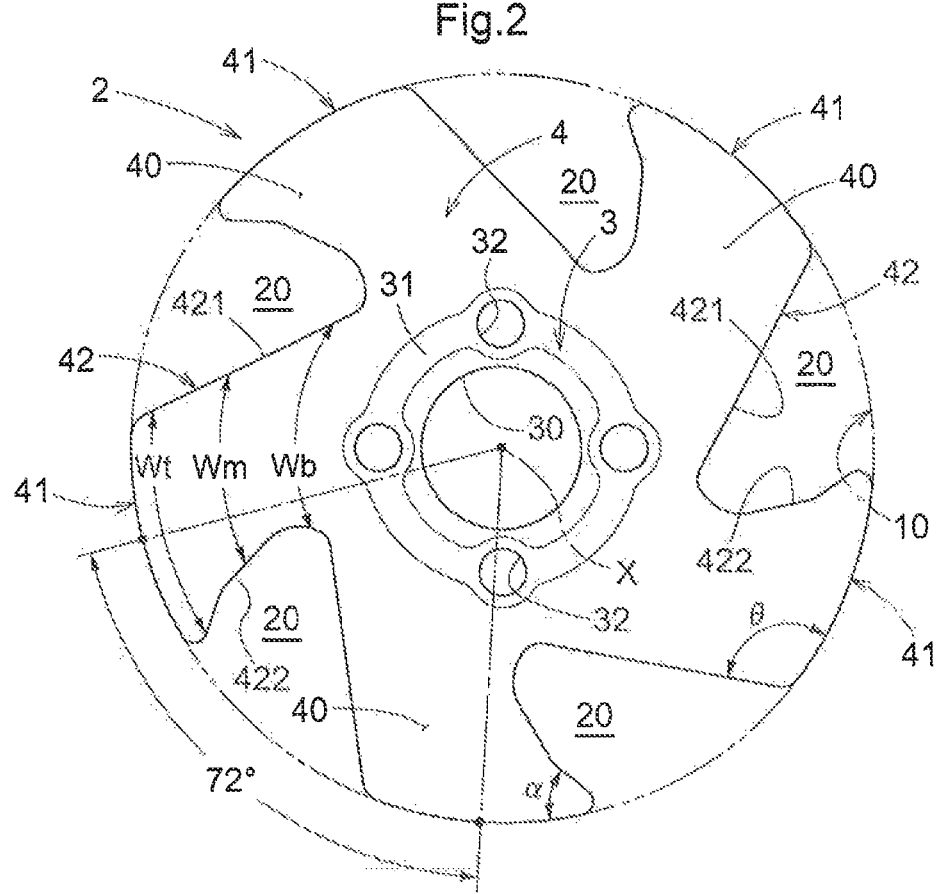
FIG. 2 is a front view of the vehicle wheel with the tire removed.

Referring to FIG. 2, the center disc 2 includes a disc portion 3 and an arm plate portion 4, which are integrally formed with the center disc 2. The disc portion 3 has a hub hole 30 centering the axis X. An annular projecting rib 31 radially spaced apart from the hub hole 30 has four hub-mounting bolt bores 32 arranged with regular intervals of central angles of 90 degrees.

The spoke plate portion 4 extends radially outward from an outer periphery of the projecting rib 31 and has an impeller shape with a plurality of (e.g., five in this embodiment) vane-shaped spokes 40 here. The spoke plate portion 4 has an outer boundary defined by a plurality of arc outer peripheral surfaces 41 and a plurality of concave boundary surfaces 42 arranged alternately to produce the plurality of vane-shaped spokes 40. More particularly, each of the arc outer peripheral surfaces 41 circumferentially continues from each of the concave boundary surfaces 42 with regular intervals (regular central angles). In the current embodiment, the five vane-shaped spokes 40 are arranged eqivangularly, and thus the arc outer peripheral surfaces 41 are arranged equiangularly with central angles of 72 degrees. Likewise, the concave boundary surfaces 42 are arranged equiangularly between two adjacent outer peripheral surfaces 41.

The arc outer peripheral surfaces 41 have a radius that is substantially the same as that of the inner peripheral surface 10 of the rim 1, and are joined to the inner peripheral surface 10 of the rim 1 by welding. Joining the arc outer peripheral surfaces 41 to the inner peripheral surface 10 of the rim 1 creates a plurality of (e.g., five, in this embodiment) holes 20 defined by the concave boundary surfaces 42 and the inner peripheral surface 10 of the rim 1. A shape of each hole 20 is determined by a shape of each concave boundary surface 42.

Each concave boundary surface 42 consists of a first edge 421 and a second edge 422 facing each other. The first edge 421 and the second edge 422 are joined together in an area near the disc portion with roundness. In the current embodiment, the first edge 421 and the adjacent arc outer peripheral surface 41 form an obtuse angle θ, and the second edge 422 and the adjacent arc outer peripheral surface 41 form an acute angle α. The first edge 421 is formed of a straight line, and the second edge 422 is formed of a bent line with two line segments. Each of the first edge 421 and the second edge 422 is joined to the adjacent arc outer peripheral surface 41 with roundness. A depth of the hole 20 is about half a radius of the center disc 2, and may be desirably varied depending on a vehicle wheel as used.

A shape of each vane-shaped spoke 40 is determined by the first edge 421 of one of the concave boundary surfaces 42, the second edge 422 of the adjacent concave boundary surface 42, and the associated arc outer peripheral surface 41. In the current embodiment, the vane-shaped spoke 40 has a proximal-end circumferential width Wb and a distal-end circumferential width Wt, which are larger than an intermediate circumferential width Wm. While the larger proximal-end circumferential width Wb contributes to increase the rigidity of the vane-shaped spokes 40, the larger distal-end circumferential width Wt contributes to rigidly joining the arc outer peripheral surfaces 41 with the inner peripheral surface 10 of the rim 1. On the other hand, the smaller intermediate circumferential width Wm contributes to light weight of the center disc 2.

Figure 3:
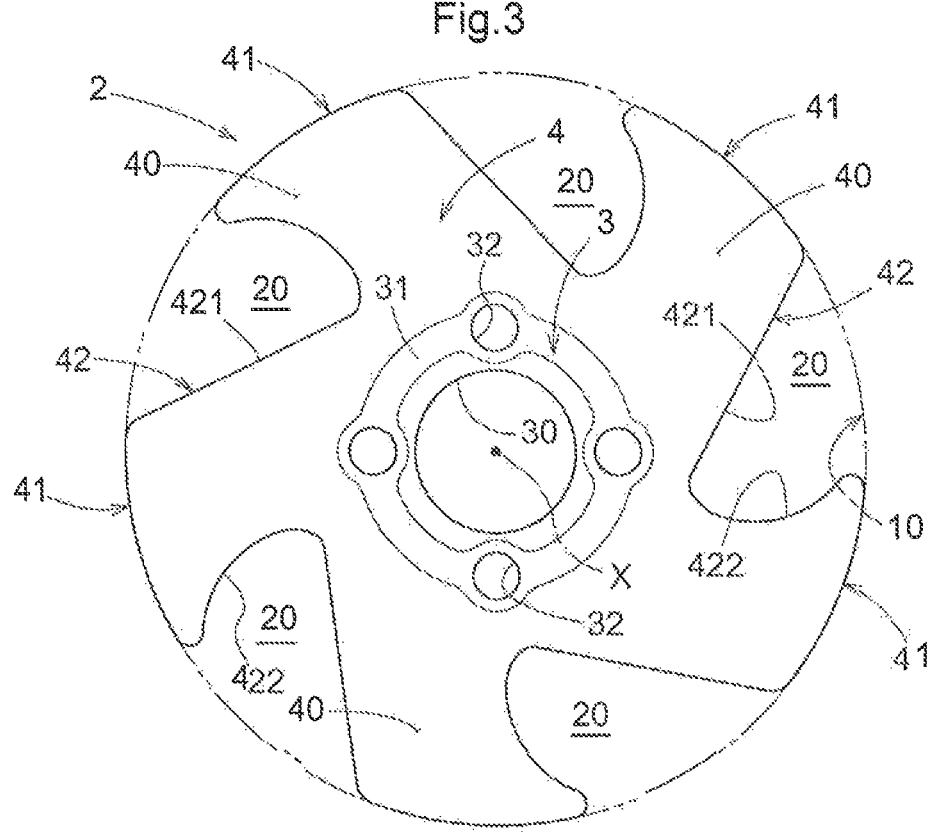
FIG. 3 is a front view of the vehicle wheel in a variation.
Figure 4:
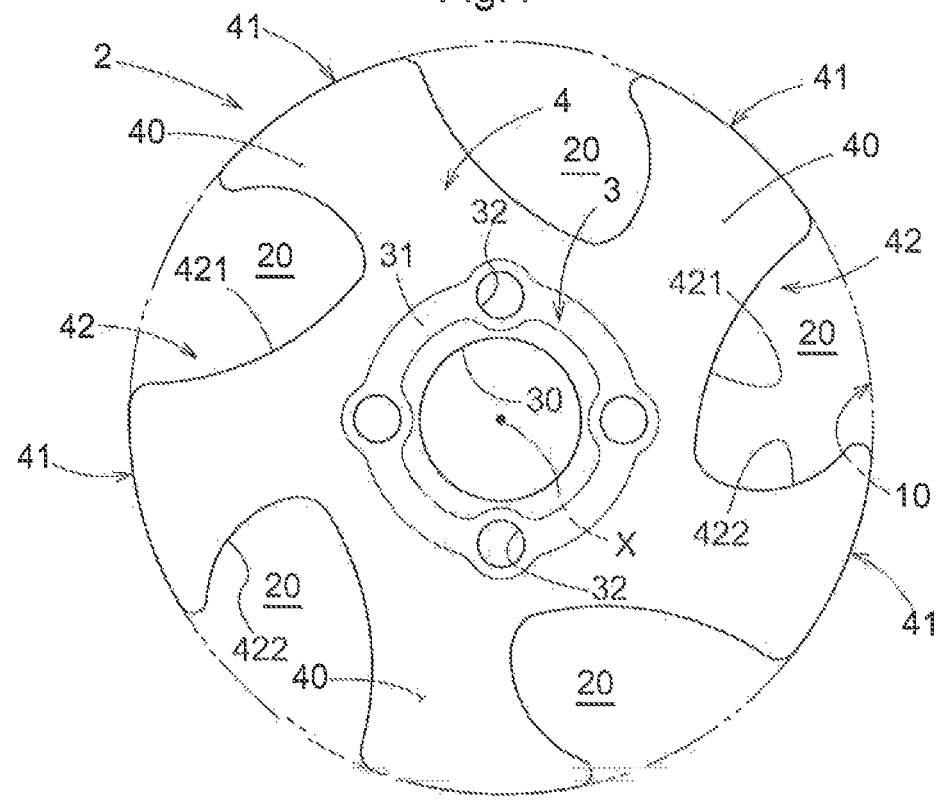
FIG. 4 is a front view of the vehicle wheel in another variation.

FIGS. 3 and 4 show alternative embodiments of the concave boundary surface 42. Referring to FIG. 3, while the first edge 421 of the concave boundary surface 42 is formed of a straight line, the second edge 422 is formed of a curved line. Referring to FIG. 4, both of the first edge 421 and the second edge 422 of the concave boundary surface 42 are formed of curved lines.

The vehicle wheel disclosed herein is applicable to various work vehicles such as utility vehicles, agricultural tractors, or lawn mowers. The number of vane-shaped spokes 40 and the shape of the concave boundary surface 42 are properly determined to meet demands of the vehicles as used.

The arrangement described in any one of the above embodiments may be combined with the arrangement described in at least one of the other embodiments unless contradiction is incurred.

It should be noted that the foregoing examples have been provided merely for the purpose of explanation, and various variations and modifications may be possible without departing from the scope of the present invention.

What is claimed is:

1. A vehicle wheel comprising:
    a rim having an inner peripheral surface; and
    a center disc including a disc portion having a plurality of hub-mounting holes, and a spoke plate portion having a plurality of vane-shaped spokes and extending radially outward from the disc portion,
    wherein the spoke plate portion includes an outer boundary defined by a plurality of non-contiguous and circumferentially-spaced arc outer peripheral edge surfaces and a plurality of concave boundary edge surfaces,
    the plurality of non-contiguous and circumferentially-spaced arc outer peripheral edge surfaces and the plurality of concave boundary edge surfaces are continually arranged alternately,
    the plurality of non-contiguous and circumferentially-spaced arc outer peripheral edge surfaces have a radius equal to a radius of the inner peripheral surface of the rim; and
    the plurality of non-contiguous and circumferentially-spaced arc outer peripheral edge surfaces are joined to the inner peripheral surface of the rim at a weld attachment interface to produce a plurality of non-symmetrically shaped holes between the vane-shaped spokes and whose inner edges are defined by the plurality of concave boundary surfaces and whose outer edges are defined by the inner peripheral surface of the rim,
    wherein each of the plurality of arc outer peripheral edge surfaces respectively circumferentially continues from the plurality of concave boundary edge surfaces.

2. The vehicle wheel according to claim 1, wherein the plurality of arc outer peripheral edge surfaces and the plurality of concave boundary edge surfaces are arranged alternately at regular circumferential intervals.

3. The vehicle wheel according to claim 2, wherein each of the plurality of vane-shaped spokes defined by one of the arc outer peripheral edge surfaces and two of the plurality of concave boundary edge surfaces adjacent to the one of the arc outer peripheral edge surfaces has a proximal-end circumferential width and a distal-end circumferential width, both of which are larger than an intermediate circumferential width of each respective vane-shaped spoke.

4. The vehicle wheel according to claim 1, wherein each of the concave boundary edge surfaces comprises a first edge and a second edge facing each other, and
    the first edge is connected to each of the plurality of arc outer peripheral edge surfaces with an obtuse angle, and the second edge is connected to each of the plurality of arc outer peripheral edge surfaces with an acute angle.

5. The vehicle wheel according to claim 4, wherein the first edge comprises a straight line, and the second edge comprises a bent line having a plurality of line segments or a curved line.

6. A vehicle wheel comprising:
    a rim having an inner peripheral surface and being configured to receive a tire;
    a center disc comprising a disc portion with a plurality of hub-mounting holes, and a spoke plate portion having a plurality of vane-shaped spokes and extending radially outward from the disc portion;
    said spoke plate portion including an outer boundary defined by a plurality of alternating and spaced apart arc outer peripheral edge surfaces and a plurality of alternating concave boundary surfaces separating the arc outer peripheral edge surfaces;
    each vane-shaped spoke having a single line segment boundary surface arranged opposite a two line segment boundary surface so as to define a plurality of non-symmetrically shaped holes arranged inside the inner peripheral surface of the rim, said two line segment boundary surface comprising a first line segment shorter than the single line segment boundary surface and a second line segment that is shorter than the single line segment boundary surface and oriented at an angle relative to the first line segment;
    each of the plurality of non-symmetrically shaped holes being defined by at least one convex surface; and
    the plurality of arc outer peripheral edge surfaces having a radius equal to a radius of the inner peripheral surface of the rim,
    wherein each of the arc outer peripheral edge surfaces is joined to the inner peripheral surface of the rim with a weld attachment interface, and
    wherein an angular orientation of the single line segment boundary surface in relation of the inner peripheral surface is different than the angular orientation of each of the two line segment boundary surfaces.

7. The vehicle wheel according to claim 6, wherein the single line segment boundary surface is straight.

8. The vehicle wheel according to claim 6, wherein the single line segment boundary surface is concave.

9. The vehicle wheel according to claim 6, wherein each of the two line segment boundary surfaces are straight.

10. The vehicle wheel according to claim 6, wherein the plurality of concave boundary surfaces are boundary edge surfaces.

11. A vehicle wheel comprising:
a rim having an inner peripheral surface and being configured to receive a tire;
a center disc comprising a disc portion with a plurality of hub-mounting holes, and a spoke plate portion having a plurality of vane-shaped spokes and extending radially outward from the disc portion;
said spoke plate portion including an outer boundary defined by a plurality of alternating non-contiguous and circumferentially-spaced arc outer peripheral edge surfaces and a plurality of alternating concave boundary surfaces;
each vane-shaped spoke having a single line segment boundary surface arranged opposite a two line segment boundary surface so as to define a plurality of non-symmetrically shaped holes arranged inside the inner peripheral surface of the rim, said two line segment boundary surface comprising a first line segment shorter than the single line segment boundary surface and a second line segment that is shorter than the single line segment boundary surface and oriented at an angle relative to the first line segment;
each of the plurality of non-symmetrically shaped holes being defined by at least one convex surface located adjacent the inner peripheral surface of the rim; and
the plurality of arc outer peripheral edge surfaces having a radius equal to a radius of the inner peripheral surface of the rim,
wherein each of the arc outer peripheral edge surfaces is joined to the inner peripheral surface of the rim via a weld attachment interface, and
wherein an angular orientation of the single line segment boundary surface in relation of the inner peripheral surface is an obtuse angle and an angular orientation of one of the two line segment boundary surfaces is an acute angle.

12. The vehicle wheel according to claim 11, wherein the single line segment boundary surface is straight.

13. The vehicle wheel according to claim 11, wherein the single line segment boundary surface is concave.

14. The vehicle wheel according to claim 11, wherein each of the two line segment boundary surfaces are straight.

15. The vehicle wheel according to claim 11, wherein the plurality of concave boundary surfaces are boundary edge surfaces.

16. The vehicle wheel according to claim 1, wherein each of the plurality of vane-shaped spokes defined by two of the plurality of concave boundary edge surfaces and said plurality of concave boundary edge surfaces are oriented radially such that an imaginary plane passing through the plurality of concave boundary edge surfaces would pass through the weld attachment interface.

17. The vehicle wheel according to claim 6, wherein the single line segment boundary surface is an edge surface and the two line segment boundary surface is an edge surface, and each said edge surface is oriented radially such that an imaginary plane passing through each said edge surface would pass through the weld attachment interface.

18. The vehicle wheel according to claim 11, wherein the single line segment boundary surface is an edge surface and the two line segment boundary surface is an edge surface, and each said edge surface is oriented radially such that an imaginary plane passing through each said edge surface would pass through the weld attachment interface.

* * * * *